United States Patent [19]

Moffatt et al.

[11] Patent Number: 5,891,934

[45] Date of Patent: Apr. 6, 1999

[54] WATERFAST MACROMOLECULAR CHROMOPHORES USING AMPHIPHILES

[75] Inventors: John Robert Moffatt; Joseph W. Tsang, both of Corvallis, Oreg.

[73] Assignee: Hewlett-Packard Company, Palo Alto, Calif.

[21] Appl. No.: 955,477

[22] Filed: Oct. 22, 1997

Related U.S. Application Data

[63] Continuation-in-part of Ser. No. 823,092, Mar. 24, 1997.

[51] Int. Cl.⁶ .................................................... C09D 5/00
[52] U.S. Cl. .............................................................. 523/161
[58] Field of Search ............................................. 523/161

[56] References Cited

U.S. PATENT DOCUMENTS

| | | | |
|---|---|---|---|
| 5,085,698 | 2/1992 | Ma et al. | 106/20 R |
| 5,180,425 | 1/1993 | Matrick et al. | 106/22 R |
| 5,302,197 | 4/1994 | Wickramanayake | 106/22 H |
| 5,531,816 | 7/1996 | Wickramanayake | 106/20 R |
| 5,648,405 | 7/1997 | Ma et al. | 523/160 |

*Primary Examiner*—Edward J. Cain

[57] ABSTRACT

Pigments that have been at least partially treated to form surface-attached functional groups are combined with long chain amine oxides in an ink-jet ink to provide waterfastness. The ink-jet ink for ink-jet printing comprises: (a) a vehicle comprising (1) 0 to about 30 wt % of at least one organic solvent, and (2) 0 to about 30 wt % of at least one water-soluble surfactant, and (3) about 0.1 to 10 wt % of at least one zwitterionic surfactant; (b) about 1 to 20 wt % of at least one chemically-modified, water-soluble macromolecular chromophore comprising a pigment having functional groups covalently attached thereto; and (c) the balance water. The inks of the invention evidence increased waterfastness with the presence of the zwitterionic surfactant, yet other properties, such as decap, kogation, and edge acuity, are not adversely affected by the presence of the zwitterionic surfactant. Indeed, decap and edge acuity are improved by the presence of the zwitterionic surfactant.

18 Claims, No Drawings

WATERFAST MACROMOLECULAR CHROMOPHORES USING AMPHIPHILES

REFERENCE TO RELATED APPLICATION

The present application is a continuation-in-part application of Ser. No. 08/823,092, filed Mar. 24, 1997.

TECHNICAL FIELD

The present invention relates generally to ink-jet inks, and, more particularly, to ink-jet inks which employ surface-treated pigments as the colorant.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum connects to a reservoir for storing the ink. A plurality of such resistor elements forms a pattern in a printhead. This pattern is called primitive. Each of the resistor elements line up with a nozzle in a nozzle plate, through which ink is expelled toward a print medium. The entire assembly of printhead and reservoir comprises an ink-jet pen.

In operation, each resistor element connects through a conductive trace to a microprocessor, where current-carrying signals cause one or more selected elements to heat. The heating creates a bubble of ink in the chamber, which is expelled through the nozzle toward the print medium. Firing a plurality of such resistor elements, in a particular order, in a given primitive, forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles (typically 50 mm diameter) require that the ink not clog the nozzles. Furthermore, repeated firings of the resistor elements, which must withstand about 10 million firings over the life of the ink cartridge, can result in fouling of the resistor element. Kogation is the term used for this type of fouling. The ink composition must be capable of interacting with the print medium, especially paper, to penetrate it without undue spreading. Finally, the ink composition should be smear and water resistant on the paper.

Many inks possess one or more of the foregoing properties. However, few ink compositions posses all of those properties, since an improvement in one property often results in the degradation of another. Thus, inks used commercially represent a compromise in an attempt to achieve an ink evidencing at least an adequate performance in each of the aforementioned properties.

Accordingly, investigations continue into developing ink formulations that have improved properties such as reduced kogation and reduced crusting (i.e. improved decap). Further properties sought to be improved include high edge acuity, high optical density, fast drying times, good waterfastness, and good smearfastness all without sacrificing performance in other necessary properties.

Recent advances in ink-jet inks have incorporated pigments in place of the earlier water-miscible dyes. However, pigments by definition are not water-miscible, and require the presence of a dispersing agent. Further investigations into the use of pigments have determined that surface treatment of the pigment, to form either anionic or cationic functional groups on the surface, provides a macromolecular chromophore (MMC) that is water-soluble, thus eliminating the need for a dispersing agent. However, the extent of the chemical treatment can adversely affect one of the prime properties of a pigment, namely, its waterfastness.

Accordingly, investigation continues into the use of pigments that have been treated to be water-miscible, but which retain their desired waterfastness.

DISCLOSURE OF INVENTION

In accordance with the present invention, pigments that have been at least partially treated to form surface-attached functional groups are combined with long chain amine oxides in an ink-jet ink to provide waterfastness. The ink-jet ink for ink-jet printing comprises:

(a) a vehicle comprising (1) 0 to about 30 wt % of at least one organic solvent, (2) 0 to about 30 wt % of at least one water-soluble surfactant, and (3) 0.1 to about 10 wt % of at least one zwitterionic surfactant;

(b) about 0.1 to 20 wt % of at least one chemically-modified, water-soluble macromolecular chromophore comprising a pigment having functional groups covalently bonded thereto; and (c) the balance water.

The inks of the invention evidence increased waterfastness with the presence of the amine oxide, yet other properties, such as decap, kogation, and edge acuity, are not adversely affected by the presence of the zwitterionic surfactant. Indeed, decap and edge acuity are improved by the presence of the zwitterionic surfactant.

BEST MODES FOR CARRYING OUT THE INVENTION

Reference is now made in detail to specific embodiments of the present invention, which illustrate the best modes presently contemplated by the inventors for practicing the invention. Alternative embodiments are also briefly described as applicable.

All concentrations herein are expressed in weight percentages, unless otherwise indicated. The purity of all components is that employed in normal commercial practice for ink-jet inks.

In accordance with the present invention, zwitterionic, or amphiphilic, surfactants, such as long chain amine oxides, provide waterfastness when mixed with anionic or cationic macromolecular chromophores (MMCs). Anionic MMCs may be partially or fully sulfonated or partially or fully carboxylated. Cationic MMCs cornprise quaternary ammonium ions as functional groups. Such MMCs are available from Cabot Corporation, for example. This waterfastness is substantially instantaneous, as observed on the following papers: Gilbert Bond, Champion Datacopy, Hammermill Fore DP, Weyerhauser First Choice, and Papyrus Multicopy. The addition of zwitterionic surfactants does not adversely impact other thermal ink-jet printing attributes, including decap (reliability), kogation, edge acuity (print quality), and actually improves decap and edge acuity. The zwitterionic surfactants are used at a concentration within the range of about 0.1 to 10 wt %, and preferably at a concentration within the range of about 0.2 to 3 wt % and most preferably about 0.5%.

This waterfastness appears to be tolerant of a wide variety of solvents including, but not restricted to, N-methyl pyrrolidone (NMP), 2-pyrrolidone (2-P), diethylene glycol (DEG), 1,5-pentanediol, 1, 3-2 methyl propanediol, 1,3,5-(2-methyl)-pentanetriol, tetramethylene sulfone, 3-methoxy-3-methylbutanol, glycerol, and 1,2-alkyldiols. Thus, any of the solvents commonly used in thermal ink-jet inks appear to be useful in the combination of zwitterionic surfactant and MMCs. Certain BRIJ surfactants, such as BRIJ surfactants having ethylene oxide units of 10 or less, also impart the same waterfastness.

The following amphiphilic amine oxides, which are a class of zwitterionic surfactants, evidence waterfastness with the anionic and cationic MMCs:

$C_nH_{2n+2}N(CH_3)_2O$ (10<n<25)

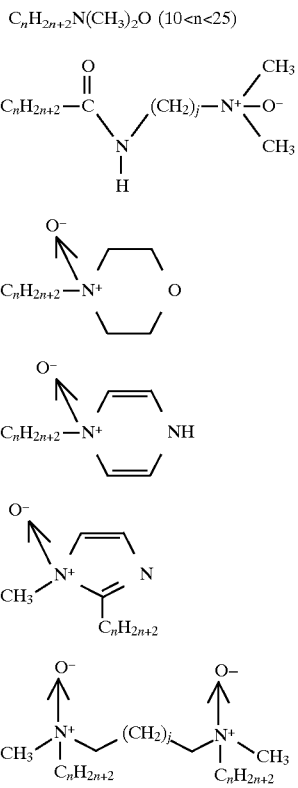

where n in the foregoing formulae is within the range of 10 to 25 and j is given by 0<j<5.

The following examples of amine oxides are preferred:

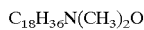

N,N-dimethyl-N-(Z-9-octa-decenyl)-N-amine oxide (OOAO)

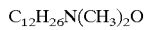

N,N-dimethyl-N-dodecyl amine oxide (NDAO).

Additional examples of amine oxides useful in the practice of the present invention include: isostearamidopropylamine oxide; isostearamidopropyl morpholine oxide; lauramine oxide; myristamine oxide; cetamine oxide; minkamidopropylamine oxide; oleamidopropylamine oxide; oleyl dimethylamine oxide; olivamidopropylamine oxide; stearamine oxide; sesamidopropylamine oxide; and wheat germamidopropylamine oxide.

Examples of other zwitterionic surfactants useful in the practice of the present invention include the betaines, which have the general formula:

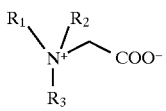

where $R_1$, $R_2$, and $R_3$ are each in the range of 10 to 23 carbon atoms. $R_1$, $R_2$, and $R_3$ may be the same or different.

In formulating the ink-jet inks of the present invention, one or more co-solvents may be employed in the vehicle. These co-solvents are substantially water-miscible. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1, ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-2-methyl propanediol, 1,3,5-(2-methyl)-pentanetriol, tetramethylene sulfone, 3-methoxy-3-methylbutanol, glycerol, and 1,2-alkyldiols. The co-solvent concentration may range from 0 to about 30 wt %, with about 3 to 15 wt % being preferred.

Water-soluble surfactants may also be employed in the practice of the present invention. The water-soluble surfactants include anionic, cationic, and non-ionic surfactants. Examples of surfactants that may be beneficially employed in the practice of the present invention include: TERGITOLs, which are polyethylene or polypropylene oxide ethers; TRITONs, which are alkyl phenyl polyethylene oxide surfactants available from Rohm & Haas Co.; BRIJs, which are polyethylene or polypropylene oxide ethers; PLURONICs, which are also polyethylene or polypropylene oxide ethers; and the SURFYNOLs, which are acetylenic ethylene oxides; polyethylene oxide (POE) esters; POE diesters; POE amines; protonated POE amines; POE amides; the polypropylene analogs of the foregoing POE compounds; dimethicone copolyols, quaternary ammonium compounds, and aerosols (sulfosuccinates).

The quaternary ammonium surfactants, which are cationic, are represented by the formula

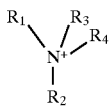

where $R_1$, $R_2$, $R_3$, and $R_4$ are organic radicals of 20 carbon atoms or less. For a single tail cationic surfactant, one of the organic radicals must be longer than 10 carbon atoms. For twin-tailed surfactants, $R_1=R_2$ and must be longer than 8 carbon atoms.

Sulfosuccinate surfactants are represented by the formula

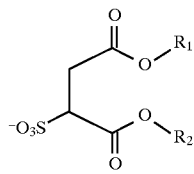

where $R_1$ and $R_2$ must have more than two carbons each.

Specific examples of surfactants that are preferably employed in the practice of this invention include, but are not limited to, polyethylene oxide-10 tetramethyl de-cynediol, iso-hexadecyl ethylene oxide 20 and TERGITOL 15-S-7. The concentration of the surfactants may range from 0 to about 30 wt %, with about 0.01 to 20 wt % being preferred.

The water-soluble macromolecular chromophores (MMCs) are commercially available from colorant vendors such as Cabot Corp. and Orient Chemical, and comprise pigments that have been at least partially functionalized, i.e., covalently bonded, with sulfonate or carboxylate groups (anionic MMCs) or with ammonium groups (cationic MMCs). Many pigments are useful in the practice of this invention. The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow 5GT, Igralite(® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

For anionic chromaphores, the counterions include all alkali metal ions and alkaline earth metal ions, as well as both substituted and unsubstituted ammonium ions. For cationic chromaphores, suitable counterions include all halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexaflurophosphonate, phosphene, phenolate, perchlorate, tungstate, molybdate, and silicate ions.

The concentration of the MMC is within the range of about 0.1 to 20 wt % and, preferably, within the range of about 0.5 to 10 wt %.

A preferred pigment is a functionalized graphite-like (carbon black) particle with mean diameter ranging from about 0.005 to 12 $\mu$m. Colorants of this type result from chemical reactions where solvent-accessible functional groups are derivatized to provide covalently bonded solubilizing groups that render the colorant soluble in water. This resulting macromolecular chromophore (MMC) is water-soluble, with its solubility being similar to that of well known and commercially used water-soluble acidic and basic dyes.

A typical formulation for an ink useful in the practice of the present invention includes at least one amine oxide (0.2 to 3 wt %), at least one water-soluble surfactant (about 0.01 to about 20 wt %), at least one solvent and/or at least one co-solvent (about 3 to 15 wt %), a macromolecular chromophore (about 0.5 to 10 wt %), and water.

To improve optical density, between 0 and about 3 wt % of at least one high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803, "High Molecular Weight Colloids which Control Bleed." The preferred high molecular weight colloids employed in the practice of this invention include, but are not limited to, low viscosity, Na alginate. The preferred concentration of the high molecular weight component colloid in the inks of this invention is about 0.25 wt %.

In the fabrication of the ink, the above-mentioned ingredients are combined and stirred mechanically or mixed using low power sonication.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

EXAMPLES

Three examples of waterfast inks are set forth below.

A waterfastness test was used that measures the amount of colorant transferred from a printed area to an unprinted area when tested. In essence, the test consists of dripping 250 $\mu$l of deionized water onto a paper on which a series of horizontal bars have been printed. The paper is maintained at an angle of 45°. The dripping of water is repeated several times on the printed pattern. At a specific time (5 minutes or 10 minutes after printing), the optical density between the bars is measured and compared to that of solid fill blocks. The amount of colorant transfer as a result of the dripping is expressed in milli-optical density units (mOD). Waterfast colorants show little or no transfer between the bars, typically less than 10 mOD units. Typical black inks, whether derived from water-soluble dyes or pigment dispersion, show optical densities between 1.4 to 1.6 OD. A transfer in the range of about 300 to 800 mOD is not considered to be waterfast.

A series of inks were formulated comprising with and without an amine oxide. The waterfastness was measured 5 minutes after printing and no further change was observed after 24 hours. This indicated that waterfastness is achieved quickly (5 minutes) and does not require extended drying to achieve complete waterfastness (24 hours).

The inks were tested on plain papers, both copy papers and bond papers. The paper designations used are as follows:

GBND Gilbert Bond
CDCY Champion Datacopy
HFDP Hammermill Fore DP
WFCH Weyerhauser First Choice
PMCY Papyrus Multicopy.

Example 1

An ink was formulated as shown below, including 0.5 wt % NDAO. An ink was also formulated having substantially the same composition, but omitting the NDAO.

Formulation:

| | |
|---|---|
| 5% | glycerol |
| 4% | tetramethylene sulfone |
| 4% | solids of Cabojet 200 (a fully sulfonated MMC) |
| 0.5% | N,N-dimethyl-N-dodecyl amine oxide (NDAO) |
| balance | water. |

An ink of the foregoing composition was printed on paper and tested for waterfastness. An ink of the same composition, but omitting the NDAO was also printed on paper and tested for waterfastness. The results are summarized in Table I below.

TABLE I

Waterfastness Results on Different Papers, in mOD.

| | GBND | CDCY | HFDP | WFCH | PMCY |
|---|---|---|---|---|---|
| Ink with NDAO | 0 | 0 | 0 | 0 | 0 |
| Ink without NDAO | 596 | 610 | 620 | 600 | 750 |

It is seen that the ink prepared in accordance with the teachings of the present invention exhibits substantially improved waterfastness.

Without the amine oxide, poor reliability, such as decap, was observed. With the amine oxide, there was no adverse change in kogation, and improved decap was observed, along with excellent edge acuity.

Example 2

An ink was formulated as shown below, including 0.5 wt % OOAO. An ink 25 was also formulated having substantially the same composition, but omitting the OOAO.

Formulation:

| | |
|---|---|
| 6% | 1,5-pentanediol |
| 0.5% | N,N-dimethyl-N-(Z-9-octa-decenyl)-N-amine oxide (OOAO) |
| 4% | solids of Cabojet 200 (a fully sulfonated MMC) |
| balance | water. |

An ink of the foregoing composition was printed on paper and tested for waterfastness. An ink of the same composition, but omitting the NDAO was also printed on paper and tested for waterfastness. The results are summarized in Table I below.

TABLE II

Waterfastness Results on Different Papers.

| | GBND | CDCY | HFDP | WFCH | PMCY |
|---|---|---|---|---|---|
| Ink with ODAO | 0 | 0 | 0 | 0 | 0 |
| Ink without OOAO | 590 | 610 | 620 | 600 | 750 |

As in Example 1, it is seen that the ink prepared in accordance with the teachings of the present invention exhibits substantially improved waterfastness.

Also as in Example 1, without the amine oxide, poor reliability, such as decap, was observed. With the amine oxide, there was no adverse change in kogation, and improved decap was observed, along with excellent edge acuity.

Example 3

Cabojet 300, which is a fully carboxylated MMC, is even more waterfast than Cabojet 200. Examples 1 and 2 above were run with the somewhat less waterfast Cabojet 200 in order to demonstrate the efficacy of the present invention in reducing waterfastness.

INDUSTRIAL APPLICABILITY

The ink compositions of the invention are expected to find use in thermal ink-jet inks, especially where improved ink characteristics, such as high edge acuity, high optical density, fast drying time, waterfastness, and smearfastness, are desired.

Thus, there has been disclosed a thermal ink-jet ink for thermal ink-jet printing which includes at least one amine oxide in conjunction with a macromolecular chromophore. It will be apparent to those skilled in this art that various changes and modifications of an obvious nature may be made; all such changes and modifications are considered to fall within the scope of this invention.

What is claimed is:

1. A thermal ink-jet ink for thermal ink-jet printing consisting essentially of:
   (a) a vehicle consisting essentially of (1) 0 to about 30 wt % of at least one water-miscible organic solvent, (2) 0 to about 30 wt % of at least one water-soluble surfactant, and (3) 0.1 to about 10 wt % of at least one zwitterionic surfactant;
   (b) about 0.1 to 20 wt % of at least one chemically-modified, water-soluble macromolecular chromophore comprising a pigment having functional groups covalently bonded thereto; and
   (c) water.

2. The ink-jet ink of claim 1, wherein said at least one organic solvent is selected from the group consisting of aliphatic alcohols, aromatic alcohols, diols, glycol ethers, poly(glycol) ethers, caprolactams, formamides, acetamides, and long chain alcohols.

3. The ink-jet ink of claim 2, wherein said at least one organic solvent is selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1, ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

4. The ink-jet ink of claim 3 wherein said at least one organic solvent is selected from the group consisting of N-methyl pyrrolidone, 1,5-pentanediol, 2-pyrrolidone, diethylene glycol, 1,3-2-methyl propanediol, 1,3,5-(2-methyl)-pentanetriol, tetramethylene sulfone, 3-methoxy-3-methylbutanol, glycerol, and 1,2-alkyldiols.

5. The ink-jet ink of claim 1, wherein said at least one solvent is present within a range of about 3 to 15 wt %.

6. The ink-jet ink of claim 1, wherein said at least one water-soluble surfactant is selected from the group consisting of an anionic, cationic, or non-ionic surfactant selected from the group consisting of alkyl phenyl polyethylene oxides, acetylenic ethylene oxides, polyethylene or polypropylene oxide ethers, polyethylene or polypropylene oxide esters, polyethylene or polypropylene oxide diesters, polyethylene or polypropylene oxide amines, protonated polyethylene or polypropylene oxide amines, polyethylene or polypropylene oxide amides, dimethicone copolyols, quaternary ammonium compounds, and sulfosuccinates.

7. The ink-jet ink of claim 6, wherein said at least one surfactant is selected from the group consisting of polyethylene oxide-10 tetramethyl decynediol, isohexadecyl ethylene oxide 20, and alkyl phenyl polyethylene oxide 15-S-7.

8. The ink-jet ink of claim 1, wherein said at least one surfactant is present within a range of about 0.01 to 20 wt %.

9. The ink-jet ink of claim 1, wherein said zwitterionic surfactant is selected from the group consisting of $C_nH_{2n+2}N(CH_3)_2O$

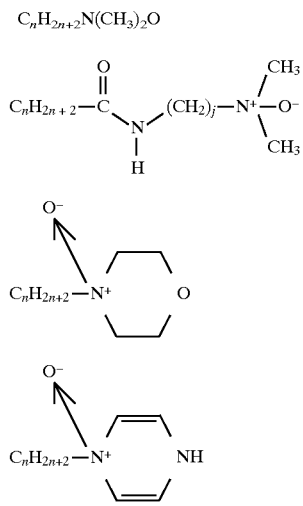

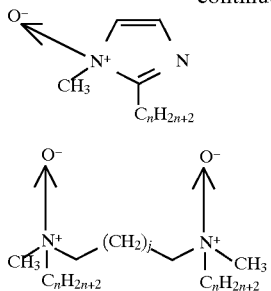

where n is within the range of 10 to 25 and j is given by 0<j<5, and

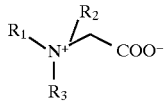

where $R_1$, $R_2$, and $R_3$ each have between 10 and 23 carbon atoms and may be the same or different.

10. The ink-jet ink of claim 9 wherein said zwitterionic surfactant consists essentially of an amine oxide selected from the group consisting of N,N-dimethyl-N-(Z-9-octa-decenyl)-N-amine oxide, N,N-dimethyl-N-dodecyl amine oxide, isostearamidopropylamine oxide; isostearamidopropyl morpholine oxide; lauramine oxide; myristamine oxide; cetamine oxide; minkamidopropylamine oxide; oleamidopropylamine oxide; oleyl dimethylamine oxide; olivamidopropylamine oxide; stearamine oxide; sesamidopropylamine oxide; and wheat germamidopropylamine oxide.

11. The ink-jet ink of claim 10 wherein said amine oxide is selected from the group consisting of N,N-dimethyl-N-(Z-9-octa-decenyl)-N-amine oxide, N,N-dimethyl-N-dodecyl amine oxide.

12. The ink-jet ink of claim 1, wherein said at least one zwitterionic surfactant is present within a range of about 0.2 to 3 wt %.

13. The ink-jet ink of claim 12, wherein said at least one zwitterionic surfactant is present at a concentration of about 0.5 wt %.

14. The ink-jet ink of claim 1, wherein said pigment is selected from the group consisting of black, cyan, yellow, and magenta pigments.

15. The ink-jet ink of claim 1, wherein said macromolecular chromophore is either (a) anionic and comprises pigment particles at least partially functionalized with either sulfonate or carboxylate groups or (b) cationic and comprises pigment particles that are at least partially functionalized with quaternary ammonium ions.

16. The ink-jet ink of claim 1, consisting essentially of:
(a) about 3 to 15 wt % of at least one said water-miscible organic solvent, about 0.01 to 20 wt % of at least one said water-soluble surfactant, and about 0.2 to 3 wt % of at least one amine oxide;
(b) about 0.5 to 10 wt % of at least one macromolecular chromophore; and
(c) water.

17. A method of ink-jet printing, comprising printing on a medium with an ink-jet ink consisting essentially of the following composition:
(a) a vehicle consisting essentially of (1) 0 to about 30 wt % of at least one water-miscible organic solvent, (2) 0 to about 30 wt % of at least one water-soluble surfactant, and (3) about 0.1 to 10 wt % of at least one zwitterionic surfactant;

(b) about 0.1 to 20 wt % of at least one chemically-modified, water-soluble macromolecular chromophore comprising a pigment having functional groups covalently bonded thereto; and (c) water.

18. A method for increasing waterfastness in an ink-jet ink comprising:

(a) providing at least one macromolecular chromophore comprising a pigment having functional groups covalently bonded thereto; and (b) combining about 0.1 to 20 wt % of said at least one macromolecular chromophore with (1) a vehicle comprising (i) 0 to about 30 wt % of at least one water-miscible organic solvent, (ii) 0 to about 30 wt % of at least one water-soluble surfactant, and (iii) about 0.1 to 10 wt % of at least one zwitterionic surfactant and (2) water to form said ink.

* * * * *